US008083823B2

(12) United States Patent
Clerget

(10) Patent No.: US 8,083,823 B2
(45) Date of Patent: Dec. 27, 2011

(54) AIR FILTRATION DEVICE FOR LIQUID OR SEMI-LIQUID PRODUCT PUMP

(75) Inventor: Bernard Clerget, Haudivilliers (FR)

(73) Assignee: Rexam Dispensing Systems S.A.S. (FR)

( * ) Notice: Subject to any disclaimer, the term of this patent is extended or adjusted under 35 U.S.C. 154(b) by 633 days.

(21) Appl. No.: 11/953,487

(22) Filed: Dec. 10, 2007

(65) Prior Publication Data

US 2008/0141635 A1 Jun. 19, 2008

Related U.S. Application Data

(63) Continuation of application No. PCT/FR2006/001275, filed on Jun. 6, 2006.

(30) Foreign Application Priority Data

Jun. 10, 2005 (FR) ...................................... 05 05940

(51) Int. Cl.
*B01D 46/00* (2006.01)

(52) U.S. Cl. ......................... 55/385.4; 96/4; 222/189.09

(58) Field of Classification Search ................. 55/385.1, 55/385.4, 524, 527; 96/13, 14; 210/266, 210/232, 264; 222/113, 181.3, 189.06, 214, 222/333, 383.1, 189.09, 207
See application file for complete search history.

(56) References Cited

U.S. PATENT DOCUMENTS 4,451,258 A * 5/1984 Jensen .......................... 604/333
5,310,094 A 5/1994 Martinez et al. .............. 222/212
5,370,638 A * 12/1994 Keyes ........................... 604/333
5,372,594 A * 12/1994 Colacello et al. ............. 604/333
5,752,629 A * 5/1998 Hardy ...................... 222/189.09
5,891,223 A * 4/1999 Shaw et al. ...................... 96/134
5,914,415 A * 6/1999 Tago ............................ 55/385.4
6,814,768 B2 * 11/2004 Keller ............................. 55/304
7,562,555 B2 * 7/2009 Nishio et al. ................... 73/23.2
2002/0066370 A1 * 6/2002 Goglio et al. .................... 96/134
2006/0255075 A1 * 11/2006 Foster et al. ............... 222/383.1
2007/0131718 A1 * 6/2007 Bistolfi .................... 222/189.09
2010/0127018 A1 * 5/2010 Laidler et al. ................. 222/207

FOREIGN PATENT DOCUMENTS

FR 2 861 059 4/2005
WO 03/026804 4/2003

OTHER PUBLICATIONS

International Search Report, Sep. 15, 2006, 2 pages.

* cited by examiner

*Primary Examiner* — Duane Smith
*Assistant Examiner* — Minh-Chau Pham
(74) *Attorney, Agent, or Firm* — St. Onge Steward Johnston & Reens LLC

(57) ABSTRACT

An air filtration device for the vent of a body of a pump used to fit a liquid or semi-liquid product distributor, the device including a filter membrane through which the product may be discharged from opening. The free edge of the membrane is connected to a support element which is tightly fixed on the opening.

12 Claims, 2 Drawing Sheets

AIR FILTRATION DEVICE FOR LIQUID OR SEMI-LIQUID PRODUCT PUMP

CROSS-REFERENCE TO RELATED APPLICATIONS

The present application is a continuation of pending International patent application PCT/FR2006/001275 filed on Jun. 6, 2006 which designates the United States and claims priority from French patent application 0505940 filed on Jun. 10, 2005, the content of which is incorporated herein by reference.

FIELD OF THE INVENTION

This invention relates to an air filtration device for a pump fitted on a liquid or semi-liquid product dispenser.

BACKGROUND OF THE INVENTION

Pharmaceutical and cosmetic products and perfume dispensers generally comprise a pump mounted on a container and activated by a push-button so as to deliver the product.

When the delivery is completed, it is necessary to equalize the loss of the discharged product volume with an equivalent volume of air which is taken from the outside, because of the depression inside the container. This air intake is automatically carried out first through the passages provided therefor inside the pump body, then via a so-called vent orifice provided through the body wall and opening inside the container. The pressure inside the container thus remains identical to that of the atmosphere outside.

However, it is necessary to provide for the filtration of the incoming air flow, if only to preserve the proprieties of the product and prevent the risks of pollution or bacterial or fungal contamination, more particularly for the packaging of pharmaceutical or cosmetic products.

The existing filtration devices are generally composed of a ring made of a filtering material mounted with a radial tightening around the pump body and covering the vent orifice.

However, this solution is not satisfactory since the ring increases the outer diameter of the pump body which involves assembling problems in the container neck and tightness problems.

Besides, the mechanical resistance of this ring is not reliable over time, which entails risks of accidental pollution. As a matter of fact, the contact area between the pump body and the filter must be perfectly air tight, so as to force it through the ring.

In addition, an excessive tightening of the ring on the pump body may entail malfunctions of the later.

SUMMARY OF THE INVENTION

The aim of this invention is to solve the problems of the prior art. This aim is reached according to the invention using a device of the preceding type, characterized in that it comprises a filter membrane through which said vent orifice may open and the free edge of which is connected to a supporting element tightly mounted on said orifice.

According to an advantageous characteristic, the pump body has a flat section extending immediately around the vent orifice.

According to another characteristic, the porosity of said membrane is comprised between 0.05 and 0.5 micrometers.

According to a first varying embodiment, said supporting element is composed of a peripheral area of said membrane located radially beyond said vent and which is directly welded or stuck onto the edges of said orifice.

According to another variation, the free edge of said membrane is engaged into an over-molded frame.

Preferably, said frame is integral with said supporting element.

Still according to this variation, said supporting element is shaped like a sleeve, the outer diameter of which is substantially equal to the inner diameter of said orifice in which it is intended to be introduced, like a plug.

Advantageously, said sleeve has a tapered end in order to facilitate its introduction into the orifice.

Besides, said frame has a shoulder coming into raised contact with the wall of the pump body in order to position the membrane with respect to said orifice.

According to still another characteristic, said membrane is positioned inside said orifice.

The device according to the invention ensures an efficient filtration of the incoming air while having minimum overall dimensions on the pump body and being localized close to the vent orifice.

The behavior of the device on the pump body is enhanced with respect to prior devices and the tightness is reinforced.

Besides, the invention results in a significant gain of filtering material because of the small surface used.

In addition, this device can be applied to various pump calibers and relatively wide ranges of products viscosity (from liquid to pasty) without it being necessary to modify or adapt to dimensions of the membrane.

BRIEF DESCRIPTION OF THE DRAWINGS

Other objects and advantages of the invention will become evident when reading the description which follows and making reference to the appended drawings in which.

DETAILED DESCRIPTION OF THE INVENTION

Figure 1:
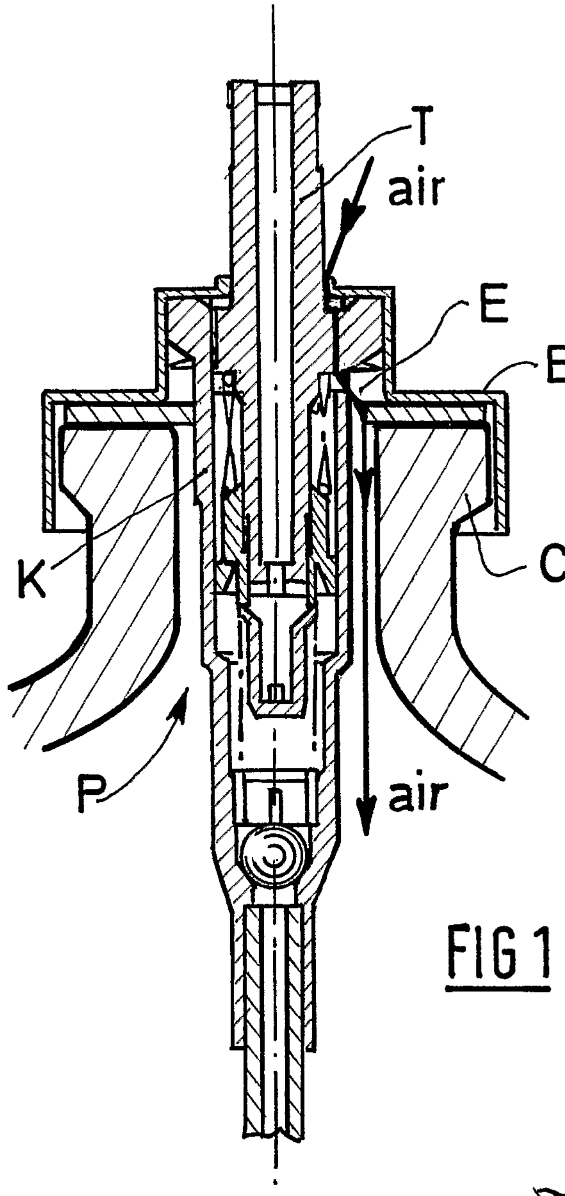
FIG. 1 shows a general view with an axial section of a pump on a container showing the passages for the air intake.

The dispenser shown in FIG. 1 comprises a pump P mounted on a neck C of container, where it is crimped with a ring B.

The body K of the pump P is composed of a cylindrical-conical enclosure which has a piston mechanism topped with a spray tube T. The body K is provided with a vent orifice E provided through its side wall and positioned above the level of the upper edge of the neck C.

When the restitution phase is completed, the depression created in the container causes the suction of an equalizing air volume which is taken from the outside through the passage defined inside the body K, at the upper part between the tube T and the inner wall of the body then through the vent orifice E and eventually at the lower part between the outer wall of the body and the inner wall of the neck C, as shown with the marked path on FIG. 1.

The device of the invention aims at filtering the air coming into the container during the return to equilibrium of pressures inside and outside the container. Therefore, the device comprises a filter membrane 1 through which the orifice E is likely to open and the free edge of which is connected to the supporting element tightly fitted on said orifice.

Figure 2A:
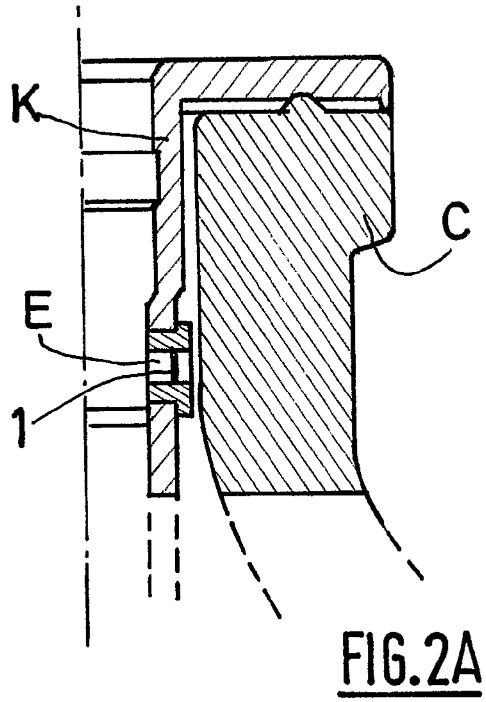
FIGS. 2A and 2B show partial, respectively sectional and profile views of an embodiment of the device of the invention mounted on a pump body.

As air goes from inside the body to the inner volume of the container, the membrane 1 is positioned either outside the body K (FIG. 4) or at least partially inside the orifice E (FIG. 2A).

The porosity of membrane 1 is adapted to the filtration of air and is comprised between 0.05 and 0.5 micrometers.

In order to facilitate the fixing of the device, the body K of the pump has a flat section M extending immediately around the vent orifice E.

Figure 3:
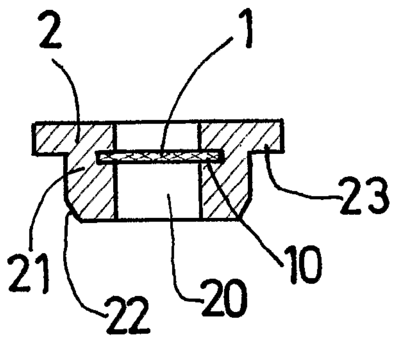
FIG. 3 shows a cross-sectional view of the embodiment of FIGS. 2A, 2B.
Figure 2B:
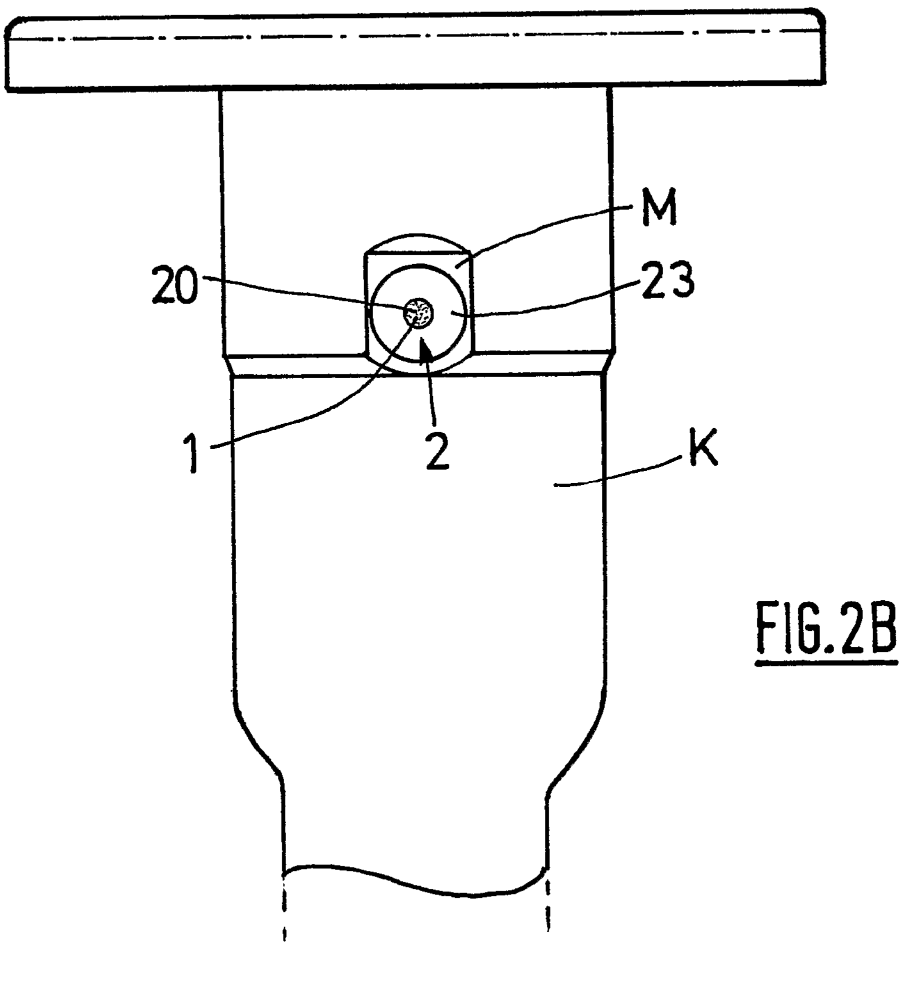

In the embodiment of FIGS. 2A, 2B and 3, the free edge 10 of said membrane 1 is engaged into a frame 2 or it is trapped by the over-molding and defines a central channel 20 through which the filtering surface of the membrane is placed.

The frame 2 is integral with the supporting element.

Here the supporting element is shaped like a sleeve 21, the outer diameter of which is substantially equal to the inner diameter of the orifice E in which it is intended to be fitted, like a plug as shown in FIGS. 2A and 2B. The fixing is then ensured by means of a simple radial tightening, if need be reinforced by gluing or welding.

Such fixing makes it possible to hold the device in the orifice E of the body K, even during the suction phase when taking air in.

As shown in FIG. 3, the sleeve 21 has a tapered end 22 to facilitate its introduction into the orifice E.

The frame 2 has a projecting shoulder 23 coming into rest contact with the wall of the body K of the pump in order to limit the driving of the device and correctly position the membrane 1 with respect to the orifice E.

In the variation of FIG. 2A, the length of the sleeve 21 is greater than or equal to the thickness of the body K wall and the membrane 1 is positioned inside the orifice E, in the thickness of the body K wall.

However, it is possible according to a variation of to provide that the membrane 1 covers the orifice E outside the body of the pump.

Figure 4:
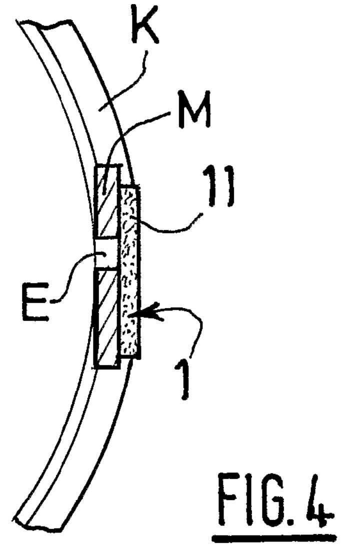
FIG. 4 shows a cross-sectional top view of another embodiment of the device of the invention applied to a pump body.

In the embodiment of FIG. 4, the supporting element is composed of a peripheral area 11 of the membrane 1 located radially beyond the orifice E and which is welded or glued directly on the flat section M up to the edges of said orifice. In this case, the central part of the membrane 1 covers the orifice E.

What is claimed is:

1. A liquid or semi-liquid product dispenser, comprising:
- a container including a neck;
- a pump mounted on the neck of said container, said pump comprising a body;
- an air filtration device for a vent orifice provided through a side wall of the body of said pump, said air filtration device comprising a filter membrane through which said vent orifice may open, wherein a free edge of the filter membrane is connected to a support element tightly fixed on said vent orifice;
- wherein the filter membrane and the support element are positioned outside of the body of said pump.

2. The liquid or semi-liquid product dispenser according to claim 1, wherein the cylindrical body of the pump has a flat section extending immediately around the vent orifice.

3. The liquid or semi-liquid product dispenser according to claim 1, wherein the porosity of said membrane is comprised between 0.05 and 0.5 micrometers.

4. The liquid or semi-liquid product dispenser according to claim 1, wherein said supporting element is composed of a peripheral area of said membrane located radially beyond said orifice and which is directly welded or stuck onto the edges of said orifice.

5. The liquid or semi-liquid product dispenser according to claim 1, wherein the free edge of said membrane is engaged into an over-molded frame.

6. The liquid or semi-liquid product dispenser according to claim 5, wherein said frame is integral with said supporting element.

7. The liquid or semi-liquid product dispenser according to claim 2, wherein the porosity of said membrane is comprised between 0.05 and 0.5 micrometers.

8. The liquid or semi-liquid product dispenser according to claim 2, wherein said supporting element is composed of a peripheral area of said membrane located radially beyond said orifice and which is directly welded or stuck onto the edges of said orifice.

9. The liquid or semi-liquid product dispenser according to claim 3, wherein said supporting element is composed of a peripheral area of said membrane located radially beyond said orifice and which is directly welded or stuck onto the edges of said orifice.

10. The liquid or semi-liquid product dispenser according to claim 2, wherein the free edge of said membrane is engaged into an over-molded frame.

11. The liquid or semi-liquid product dispenser according to claim 3, wherein the free edge of said membrane is engaged into an over-molded frame.

12. A liquid or semi-liquid product dispenser, comprising:
- a container including a neck;
- a pump mounted on the neck of said container, said pump comprising a cylindrical body;
- an air filtration device for a vent orifice provided through a vertical side wall of the cylindrical body of said pump, said air filtration device comprising a filter membrane through which said vent orifice may open, wherein a free edge of the filter membrane is connected to a support element tightly fixed on said vent orifice;
- wherein the filter membrane and the support element are positioned outside of the body of said pump.

* * * * *